(12) United States Patent
Holland

(10) Patent No.: US 9,768,581 B2
(45) Date of Patent: *Sep. 19, 2017

(54) PUMP AND SIGNAL COMBINER FOR HIGH NUMERICAL APERTURE USE

(71) Applicant: OFS FITEL, LLC, Norcross, GA (US)

(72) Inventor: William R Holland, Upper Black Eddy, PA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/601,888

(22) Filed: Jan. 21, 2015

(65) Prior Publication Data

US 2016/0211639 A1     Jul. 21, 2016

(51) Int. Cl.
| | |
|---|---|
| *H01S 3/094* | (2006.01) |
| *G02B 6/04* | (2006.01) |
| *G02B 6/255* | (2006.01) |
| *H01S 3/067* | (2006.01) |

(52) U.S. Cl.
CPC .......... *H01S 3/094053* (2013.01); *G02B 6/04* (2013.01); *G02B 6/255* (2013.01); *H01S 3/06733* (2013.01); *H01S 3/094019* (2013.01); *H01S 3/0675* (2013.01); *H01S 3/094007* (2013.01)

(58) Field of Classification Search
CPC ......... H01S 3/094053; H01S 3/094042; H01S 3/06733; H01S 3/06754; G02B 6/04; G02B 6/255

See application file for complete search history.

(56) References Cited

U.S. PATENT DOCUMENTS

| | | | |
|---|---|---|---|
| 2010/0061409 A1* | 3/2010 | Kitabayashi | H01S 3/0064 372/6 |
| 2012/0051692 A1* | 3/2012 | Seo | G02B 6/2852 385/28 |
| 2014/0268311 A1* | 9/2014 | Zhu | G02B 6/02 359/341.3 |

* cited by examiner

*Primary Examiner* — Xinning Niu
(74) *Attorney, Agent, or Firm* — Sam S. Han, Esq.

(57) ABSTRACT

As kilowatt class fiber laser and amplifier systems become more in demand, there are ongoing efforts to improve optical fiber laser and amplifier designs to maximize efficiency and further increase the capacity of these high-energy optical fiber lasers and amplifiers. The present disclosure provides a fiber laser or amplifier system configured to efficiently and conveniently generate and couple high numerical aperture and high-energy pump light into a fiber laser or amplifier system.

16 Claims, 9 Drawing Sheets

Input

NA ~ 0.15

Output

NA ~ 0.45

PUMP AND SIGNAL COMBINER FOR HIGH NUMERICAL APERTURE USE

CROSS-REFERENCE TO RELATED APPLICATIONS

This application incorporates by reference the following patent applications as if they were expressly set forth herein in their entireties:

U.S. patent application Ser. No. 14/601,808, having the title "Optical Fiber Laser Architecture with Partitioned Pump and Signal Coupling," filed concurrently with this application;

U.S. patent application Ser. No. 14/601,918, having the title "A Fat-Fiber Adapter for Pump Light," filed concurrently with this application; and U.S. patent application Ser. No. 14/601,938, having the title "An All Pump Combiner with Cladless Inputs," filed concurrently with this application.

BACKGROUND

Technical Field

The present disclosure relates generally to fiber-based gain systems and fiber laser amplifiers.

Description of the Related Art

As kilowatt-class fiber-based gain systems (e.g., fiber lasers, fiber amplifiers, etc.) become more in demand, there are ongoing efforts to improve these designs to maximize efficiency and further increase the power capacity of these high-energy optical-fiber-based gain systems.

SUMMARY

In one embodiment, the disclosed gain system utilizes a novel non-tapered pump and signal combiner, which allows for coupling of partitioned high numerical aperture (NA) pump light outside a lasing cavity. Thus, the novel architecture allows for improved performance as compared with conventional gain systems.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Optical-fiber-based gain systems (e.g., fiber lasers, fiber amplifiers, etc.) are used in many applications. For example, high powered optical fiber lasers are used in many fields and industries, including many applications relating to cutting and welding.

Demands for increased power output and efficiency are ever present in the field of optical-fiber-based gain systems. In theory, potential power output of optical-fiber-based gain systems have increased over time as a result of improvements in various aspects of fiber materials and design as well as signal management techniques such as combining schemes and use of higher order modes. However, due in part to limitations of conventional fiber gain architecture, the potential capacities of optical-fiber-based gain systems have yet to be fully realized.

Factors that Affect Optical-Fiber-Based Gain System Design

To more fully appreciate how conventional optical fiber architecture limits capacities of fiber-based gain systems, attention is directed to FIGS. 1 through 3B, which detail various aspects of conventional fiber-based gain systems. As an initial matter, it should be noted that, for fiber amplifiers, a primary optical fiber carries the signal for amplification, while, for fiber lasers, the primary optical fiber carries the fundamental laser mode or signal reflected from a grating (in certain configurations). For simplicity, throughout this document, the fundamental mode and the signal for amplification are both denoted as the "signal."

Figure 1:
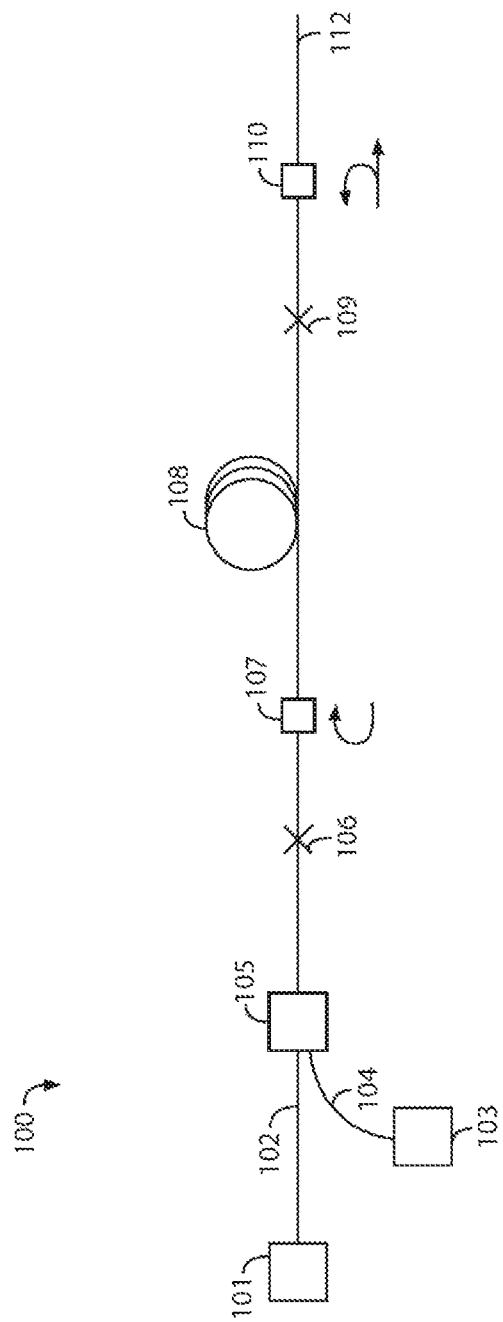
FIG. 1 shows a configuration of a gain-doped optical fiber laser.

To begin, FIG. 1 shows a configuration of a gain-doped optical system 100. Specifically, FIG. 1 shows an amplifier configuration. However, one having skill in the art will understand that the system can be configured as a laser. In a typical end-pumping scheme, for a fiber amplifier, a signal from a signal source 101 is carried by a signal fiber 102, while pump light generated from pump sources 103 is carried by pigtail pump fibers 104. The signal and pump are then combined in a pump and signal combiner 105, which, in most gain systems, is a tapered fiber bundle (TFB). The architecture of a TFB undesirably restricts an amount of pump light that can be introduced into a fiber-based gain system.

Figure 2A:
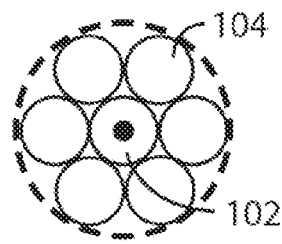
FIG. 2A shows a cross section of an input end of a tapered fiber bundle pump-signal combiner.
Figure 2B:
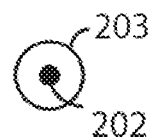
FIG. 2B shows a cross section of an output end of a tapered fiber bundle pump-signal combiner.

To fully appreciate why the TFB limits the capacity of a fiber-based gain system, attention is directed to FIGS. 2A and 2B, which show aspects of the TFB in greater detail. FIG. 2A shows a cross section of an input end of the TFB 105 (FIG. 1). As shown in FIG. 2A, a signal fiber 102 is surrounded by pump fibers 104, which are located radially exterior to the signal fiber 102 on the input end of the TFB 105 (FIG. 1). Pump fibers 104 are optically coupled to the signal fiber 102.

With the input configuration of a TFB in mind, attention is turned to FIG. 2B, which shows a cross section of an output end of TFB 105. As shown in FIG. 2B, as the pump fibers 104 and signal fiber 102 are combined, they are tapered and effectively fused 203 so as to allow for splicing (splice point at the end of the TFB 105 is shown as 106 in FIG. 1) to a gain-doped optical fiber 108 (FIG. 1). In other words, the cross sectional area of the TFB 105 is larger on the input end (FIG. 2A) as compared to the output end (FIG. 2B). Consequently, as one having ordinary skill will appreciate, the tapering results in changes to a numerical aperture (NA) of the signal propagating from the input end to the output end of the TFB. Specifically, the NA increases from the input end, for example from 0.15, to the output end of the TFB, for example to 0.48.

Insofar as the output end (FIG. 2B) is coupled to the gain-doped optical fiber 108, the NA of the output end of the TFB is restricted to the NA of the gain-doped optical fiber 108. Stated differently, an output NA of pump and signal combiner 105 (FIG. 1) must be equal to or less than the NA of the optical fiber to which it is spliced to avoid adverse loss of light. Typically, the gain-doped optical fibers used in fiber-based gain systems have a NA in the range of approximately 0.4 to 0.48, and have a diameter of approximately 125 microns to approximately 400 microns. Thus, the input light and the taper of the TFB must be controlled such that the output light has a NA of 0.48 or less and has a diameter equal to the diameter of the gain doped optical fiber 108 to avoid light loss. Another corresponding drawback is that the core of the signal fiber 102 also experiences a tapering effect that changes the modal properties of the core.

One having ordinary skill in the art will also appreciate that these drawbacks limit the diameter of the input side (FIG. 2A) of the TFB. For example, if the input diameter is too large, this will result in too great of a taper from input to output side, which consequently results in output light having a NA greater than 0.48. This in turn results in inefficient pump light coupling, reduced pump efficiency, and reduced power output. An increase in the number of pump fibers results in a larger input diameter of the TFB and a corresponding increase in taper and output NA. Therefore, the number of pump fibers that can be combined with the signal fiber is limited in currently available end-pumped fiber-based gain systems. Importantly, this restricts the amount of pump power that can be introduced into a conventional fiber-based gain system, which imparts undesirable limitations on output power.

Moreover, the architecture of the pump fibers in a conventional combiner limits performance of a fiber-based gain system. Conventional pump fibers 104 (FIG. 2A) have a glass-clad construction. This glass cladding maintains the pump light within a core of the pump fiber. It is easy to appreciate that the glass cladding increases the diameter of a conventional pump fiber. As previously discussed, the input diameter of a conventional TFB combiner is limited. Thus, by increasing the diameter of a pump fiber with a glass cladding, the number of pump fibers that can be combined is further restricted so as not to exceed a maximum allowable input diameter.

Further, the glass cladding of conventional pump fibers acts in other ways to restrict pump input. As the pump fibers 104 become tapered and the NA of the propagating signal increases, pump light having a NA that is greater than the NA of the pump fiber will leak into the cladding. One having ordinary skill will appreciate that this leads to a decrease in energy density of the combined pump light and a decrease in brightness. Suffice it to say, there are limitations on how much a TFB can be tapered without adversely affecting the performance of the optical-fiber-based gain system. Thus, the increase in NA from input (FIG. 2A) to output (FIG. 2B) of the TFB needs to be precisely controlled.

With these and other limitations of a conventional pump and signal combiner in mind, discussion of the adverse limitations of conventional gain-system architecture continues with FIG. 1. In a conventional fiber-based gain system 100, a combined pump and signal output, such as the output end of a TFB (FIG. 2B), is spliced 106 to a high-reflector fiber Bragg grating (FBG) 107, which is in turn spliced to the gain-doped optical fiber 108. At the other end, the gain-doped optical fiber 108 is spliced 109 with an output fiber 112. Additionally, there is an output coupler 110, typically another FBG, located on the output fiber 112. The combination of the high reflector FBG 107 and the output coupler 110 generate a lasing cavity.

Conventional end-pumped optical-fiber-based gain systems such as that shown in FIG. 1 have an increased potential for fiber failure. As one having ordinary skill in the art will appreciate, introduction of pump light in an end-pumping scheme (FIG. 1) occurs outside the lasing cavity. Stated differently, in a typical end-pumping scheme, the pump is introduced before the high reflector FBG (shown as 107 in FIG. 1). Since writing a FBG on a core of an optical fiber requires stripping of an optical fiber cladding followed by cladding patching after writing the FBG, one having ordinary skill will appreciate that the patch creates a weak point in the optical fiber. Therefore, conventional end pumping schemes have an increased potential for fiber failure as pump light, which is typically high-energy, is propagated over the weak point.

Figure 3A:
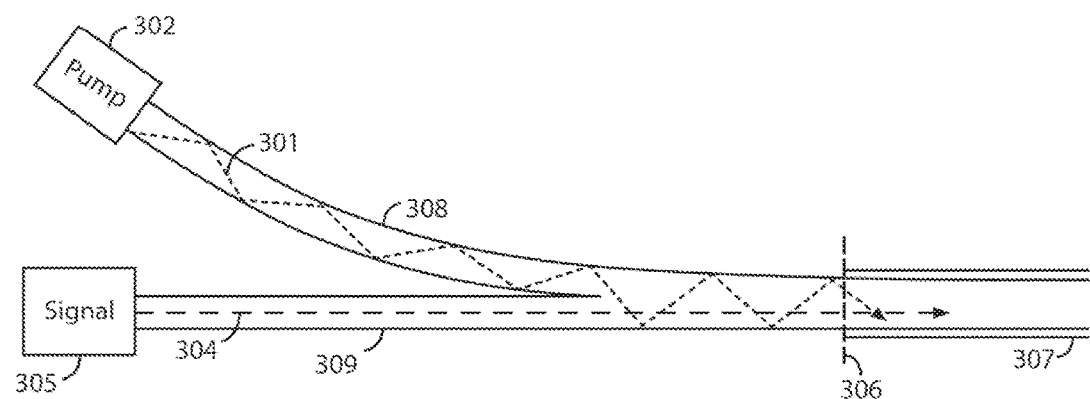
FIG. 3A shows a configuration of a side-pumping scheme.
Figure 3B:
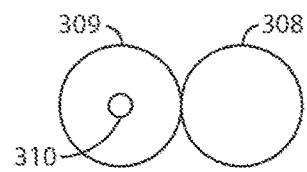
FIG. 3B shows a cross section of a fused fiber of FIG. 3A.

Alternative pumping schemes exist that permit pumping the lasing cavity directly. However, these schemes are not as robust as end-pumping and therefore have met with limited success. One such example is known in the art as side-pumping, which is shown in FIGS. 3A and 3B. Side-pumping is a technique of optically pumping a laser gain medium, where the pump light is introduced substantially parallel to the signal (FIG. 3B). FIG. 3A shows a configuration of a side-pumping scheme in which a pump fiber 308 is fused adjacent to a signal fiber 309. The resulting side-pumped fiber is then spliced 306 with a gain-doped fiber 307.

Contrasted with end-pumping (FIG. 1), side-pumping makes it relatively easy to receive high-NA pump light. However, conventional side pumping has several disadvantages, which make end-pumping a more attractive scheme for most applications. The limited use of side-pumping is also due in part to difficulties associated with the manufacture of optical fibers necessary for use in side-pumping. To manufacture these fibers, they are drawn simultaneously from two side-by-side fiber preforms, thereby adding to complexity and expense in the manufacturing process. In sum, although side-pumping schemes may allow for pumping the lasing cavity directly, their aforementioned shortcomings usually outweigh their benefits.

In sum, conventional configurations of optical-fiber-based gain systems are limited in their ability to produce high-energy output signals efficiently. Generally, these limitations arise from an inability of conventional optical-fiber-based gain systems to efficiently couple high NA pump light. Therefore, there exists a need to design optical-fiber-based gain systems that can efficiently couple high NA pump light to efficiently increase output power of these systems.

Example Embodiments Taking into Account Various Design Factors

The embodiments disclosed herein seek to improve pumping efficiency for optical fiber and amplifier systems by employing a novel fiber laser architecture that relies on producing and coupling a high NA pump light (high meaning about 0.40 to about 0.48) with a signal. In one embodiment, low NA pump light from several pump diodes are combined to produce a single high NA pump light, which is propagated along a fat-fiber (a fiber where all of the introduced pump light is combined). The high NA pump light is then effectively split into multiple pumps, all having the same high NA. These high NA pumps are combined with a signal fiber by a novel non-tapered fiber combiner. In a preferred embodiment, high NA pump light is combined with the signal within a lasing cavity (i.e., between reflecting elements (e.g., FBGs)).

The purpose of combining pump light and then splitting the pump light is to provide a mechanism by which pump sources can be partitioned from the gain system itself. This partitioning permits a more convenient way of connecting pump sources to the gain system without the inconvenience of individually connecting multiple pump sources, one at a time, to the gain system. Details of this advantage, among others, are provided below.

The presently disclosed embodiments permit pumping using a high NA pump, which translates directly into increased pump energy and thus, increased power output. Further, several embodiments of the non-tapered combiner allow for pump and signal paths to be divided more cleanly and efficiently than can be realized by conventional pump and signal combiners, thus, increasing the overall efficiency of the optical fiber-based gain system. Insofar as the high NA pump is generated independently of combining the pump and signal, the present embodiments permit partitioning of a pump source from the rest of the optical-fiber-based gain system. Partitioning the pump from the optical-fiber-based gain system offers several advantages over conventional configurations, such as increasing flexibility in manufacturing, repairing, and upgrading the optical-fiber-based gain system.

As described in greater detail herein, using a fiber laser configuration that permits pumping high NA light results in increased performance of the optical fiber-based gain system. With this in mind, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

With the aforementioned design factors in mind, attention is now turned to FIGS. 4 through 8C, which show various embodiments of the present disclosure. Discussion of the disclosed embodiments begins with a closer examination of a novel optical-fiber-based gain system architecture.

Figure 4:
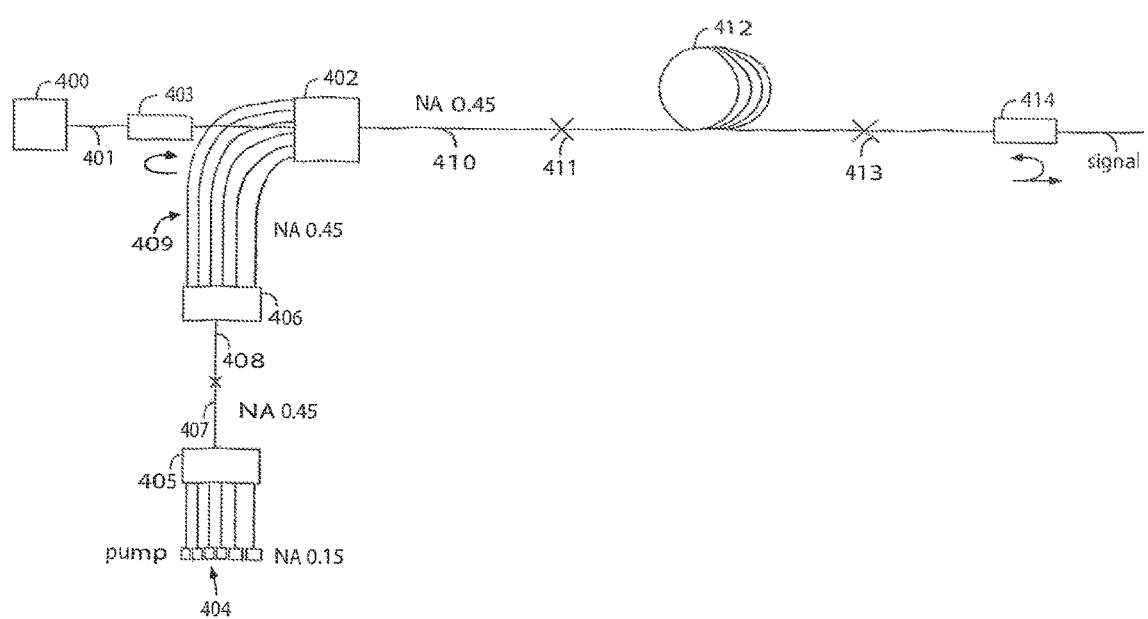
FIG. 4 shows an embodiment of an optical fiber laser architecture employing a non-tapered high numerical aperture (NA) partitioned pump and signal combiner.

FIG. 4 shows an embodiment of a fiber-based gain architecture employing a non-tapered high NA pump and signal combiner. Recalling from the description above, the term "signal" refers to either the fundamental mode for a fiber laser or the to-be-amplified signal for a fiber amplifier. As shown in FIG. 4, a signal (e.g., from a signal source 400 for a fiber laser) is propagated through a signal fiber (in this particular embodiment, a single mode fiber 401) into a novel high NA pump and signal combiner 402. Located on the fiber 401 is a high-reflector FBG 403. Pump light with a low NA of less than approximately 0.22 (preferably approximately 0.15) from pump sources 404 are combined in a novel all-pump combiner 405 with cladless inputs, which is discussed in greater detail with reference to FIGS. 6A through 6C. The all-pump combiner 405 produces a single pump light with a high NA of approximately 0.45 or greater. In other words, the all-pump combiner 405 provides a mechanism by which energy from multiple pump sources 404 are combined to produce a single higher-energy pump source. Thus, by providing a single high-energy pump source, one can more-conveniently couple pump light to the gain system through a single connector, rather than using multiple connectors, each of which corresponds to each of the multiple pump sources.

The all pump combiner 405 further comprises an output fiber 407. The single high NA pump light is then transmitted through a novel fat-fiber adapter 406, which is spliced to the output fiber 407 via input fiber 408. The fat-fiber adapter 406 effectively splits a large diameter input fiber 408 (approximately 300 µm or greater), carrying the high NA pump light, into multiple smaller diameter fibers 409 while maintaining the same NA. In other words, the NA of the pump is substantially the same before and after being effectively split. The split high NA pump is combined with the signal through the high NA pump and signal combiner 402. As noted above, the all-pump combiner 405 produces a single, high-power pump light. However, since the pump light is introduced into the gain system through the high NA pump and signal combiner 402, which has multiple pigtail fibers, the previously combined pump light must be split so that it can be input through those pigtail fibers. This pump-splitting function is performed by the fat-fiber adapter 406, which interfaces with the high NA pump and signal combiner 402 to introduce the pump light to the gain system.

The high NA pump and signal combiner 402 comprises an output fiber 410, which is spliced at 411 with a gain-doped optical fiber 412. The gain dopant can be any rare-earth dopant, such as Ytterbium (Yb) or Erbium (Er). The gain-doped fiber is spliced at 413 with an output fiber. The signal exits the lasing cavity through an output coupler 414, which is preferably a FBG. One having ordinary skill in the art will appreciate that alternatives to FBGs may be used such as mirrors, interferometers, and the like.

Importantly, the novel architecture of the disclosed embodiments permits the pump to be introduced within the lasing cavity (i.e., between the two reflecting elements (e.g., FBG)). In contrast to conventional fiber-gain-systems, e.g., FIG. 1 where high-power pump is introduced before the weak point created by the cladding patch, in the disclosed embodiments, the pump is introduced after the high-reflector FBG 403 (i.e., after the weak point created by the cladding patch)). Insofar as the high intensity pump does not cross the weak point in the fiber, pump loss is greatly reduced by the present embodiments, leading to improved laser efficiency. It should be appreciated that, although it is technically possible for conventional gain-systems to introduce the pump light into the lasing cavity, the drawback of this approach for conventional systems is that any signal loss of the combiner is added into the lasing cavity itself.

While not specifically shown in FIG. 4, the fiber-gain-system of FIG. 4 can be counter-pumped by placing similar pumping components at the output end of the gain fiber, before the output coupler 414. Additionally, it should be appreciated that the counter-pumping scheme can be used in conjunction with the pumping scheme shown in FIG. 4 to produce a co-pumped architecture.

With the details and advantages of the novel fiber-gain system of FIG. 4 in mind attention is turned to FIGS. 5A through 5E, which show various aspects of one embodiment of the non-tapered high NA pump and signal combiner 402 (FIG. 4). Generally, embodiments of the non-tapered high NA pump and signal combiner 402 overcome the aforementioned limitations that exist in conventional TFBs by accepting high NA pump light. Because there is no significant change in diameter from an input end to an output end of the non-tapered high NA pump and signal combiner 402, there is correspondingly no substantial change in NA from the input end to the output end.

Figure 5A:
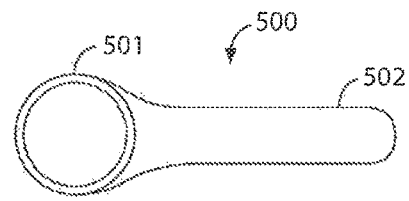
FIG. 5A shows one embodiment of a capillary tube.
Figure 5B:
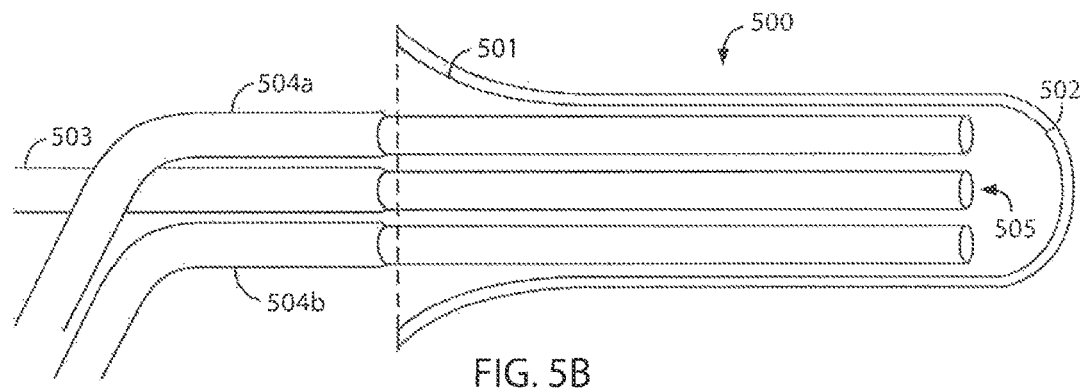
FIG. 5B shows one embodiment of coating-free sections of optical fibers inserted in the capillary tube of FIG. 5A.
Figure 5C:
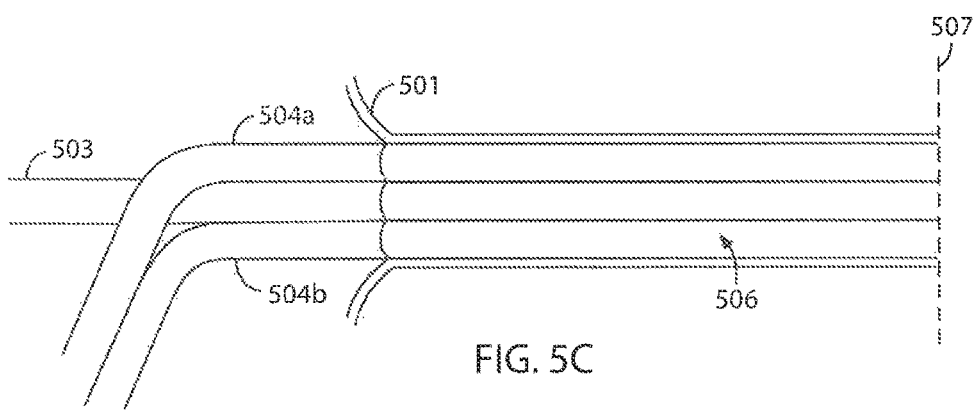
FIG. 5C shows one embodiment of fused signal and pump fibers after collapsing the capillary tube of FIG. 5B.

With this general description of the non-tapered high NA pump and signal combiner 402 in mind, attention is directed to FIGS. 5A through 5E, which shows components of one embodiment of a process to manufacture the disclosed pump and signal combiner 402. Turning to FIG. 5B, the manufacturing process for the non-tapered high NA pump and signal combiner comprises removing coatings from one end 505 of a signal fiber 503 and one or more pump fibers 504a-504b (collectively 504). Preferably, the pump fibers 504 are all-silica fibers with a low-index coating, which propagates pump light with a NA of approximately 0.48 or greater. The coating-free ends of the fibers 503, 504 are inserted into the tube 500 (FIG. 5A) through the open end 501. Continuing, as shown in FIG. 5C, the tube 500 is collapsed on the coating-free sections 505 of the fibers 503, 504, effectively fusing together the fibers 503, 504 and forming a non-tapered fused fiber bundle 506.

The non-tapered fused bundle 506 is then cleaved at a suitable location 507. Unlike a TFB, the resulting non-tapered fused bundle 506 has no significant change in NA from input end to output end due to the lack of a taper. Suffice it to say that the disclosed non-tapered pump and signal combiner can accept high NA pump light while still having efficient coupling to a gain-doped output fiber, which results in improved optical fiber-based gain system performance over conventional systems.

Figure 5D:
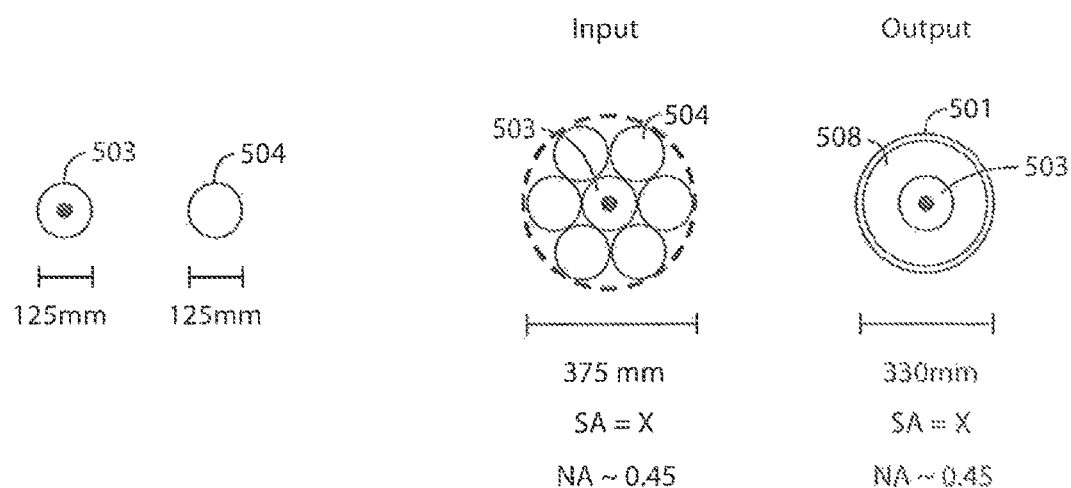
FIG. 5D shows a cross section of the coating free sections of optical fiber inserted into the capillary tube before and after collapsing of the capillary tube.

To more fully appreciate the disclosed non-tapered high NA combiner, attention is directed to FIG. 5D, which shows a cross section of the coating free sections (505, FIG. 5B) of optical fiber inserted into the tube 500 before and after the collapsing of tube 500. As shown in FIG. 5D, any decrease in the cross section of the non-tapered fiber combiner from the non-fused input fibers to the fused fiber bundle output is minimal and thus, insignificant, as any space between individual fibers is eliminated as the fibers become fused. For example, a single optical fiber is typically 125 µm in diameter. Thus, in an embodiment of the high NA pump and signal combiner that is configured as 7×1 (six pump fibers 504 surrounding one signal fiber 503), the input side has a cross-sectional diameter of approximately 375 µm, or the width of three fibers. Fusion of the signal fiber 503 and pump fibers 504 results in elimination of the space between the fibers and a cross-sectional diameter of approximately 330 µm.

Figure 5E:
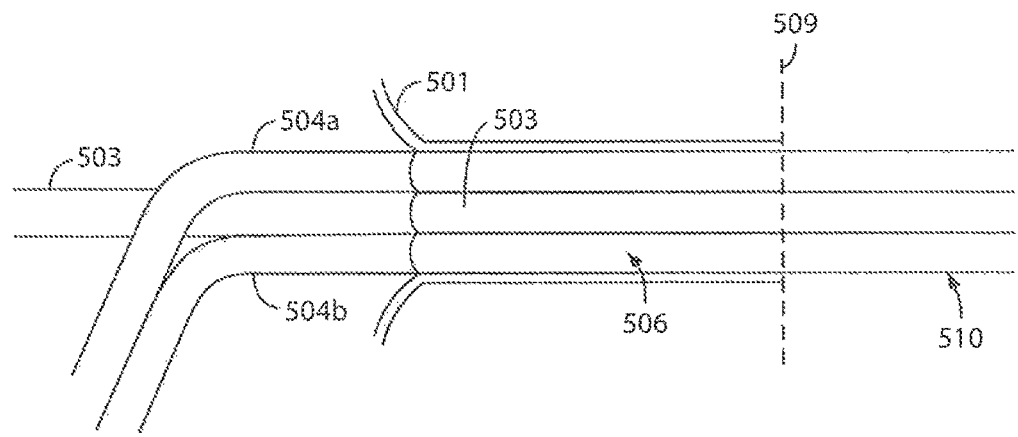
FIG. 5E shows one embodiment of a high NA pump and signal combiner.

Continuing with FIG. 5E, after manufacturing the non-tapered fused bundle 506, the cleaved end (507, FIG. 5C) of the non-tapered fused bundle 506 is spliced 509 to an output fiber 510. To maximize efficiency of the non-tapered high NA pump and signal combiner, the output fiber 510 is preferably core and cladding match-spliced to the fused bundle of the non-tapered high NA pump and signal combiner.

In sum, the disclosed non-tapered high NA pump and signal combiner offers several advantages over conventional combiners and pumping schemes. The disclosed non-tapered high NA pump and signal combiner can accept high NA (greater than approximately 0.48) input pump light. As will become more apparent with reference to FIGS. 6A through 7, an ability to accept high NA pump light permits introduction of more pump energy into the system, which results in improved performance for optical fiber-based gain systems. Additionally, the non-tapered high NA combiner does not require use of any special pedestal or other fiber as the signal fiber in the non-tapered fused bundle 506, thus opening a possibility of using arbitrary low mode area fibers or polarization-maintaining fibers. Collapsing the tube 500 around signal fiber 503 and pump fibers 504 results in a fused fiber bundle with near perfect core centering, which permits improved splicing to an output fiber 510. One having ordinary skill will appreciate that improved splicing reduces signal and pump loss, which results in increased system efficiency and performance. Moreover, the non-tapered high NA pump and signal combiner forms a distinct component that can be spliced at its output onto a gain fiber, which has advantages for manufacturing and repair.

Additional aspects of the disclosed embodiments capitalize on the ability of cladless inputs to accept high NA pump light. For example, as disclosed in relation FIGS. 6A through 8C, below, more pump light can be introduced to an optical fiber-based gain system by combining high NA pump light, which is typically not feasible for conventional optical-fiber-based gain systems such as those shown with reference to FIGS. 1 through 3B. One having an ordinary skill in the art will appreciate that the ability to combine high NA pump light results in increased power, which is desirable for many applications.

Figure 6A:
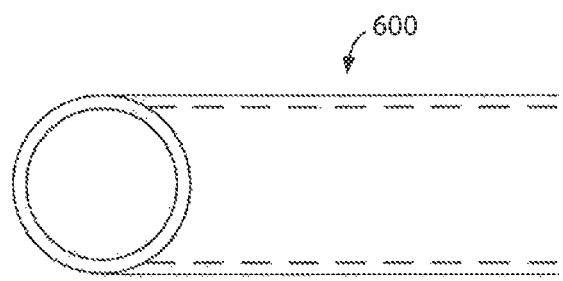
FIG. 6A shows another embodiment of a capillary tube.
Figure 6B:
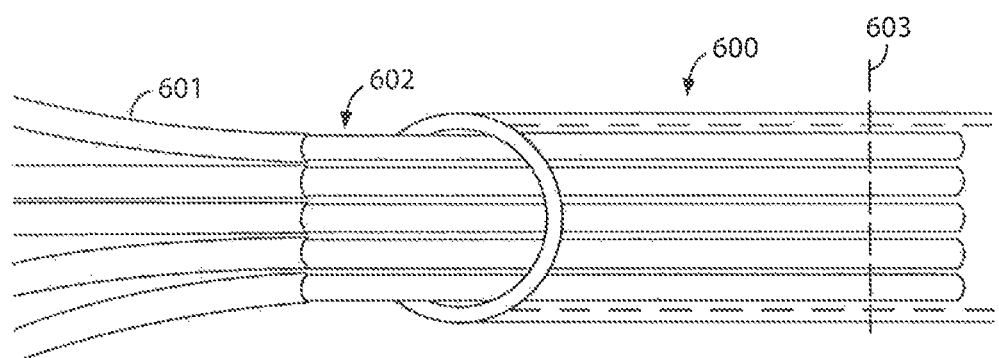
FIG. 6B shows one embodiment of cladless pump input fibers inserted into the capillary tube of FIG. 6A.
Figure 6C:
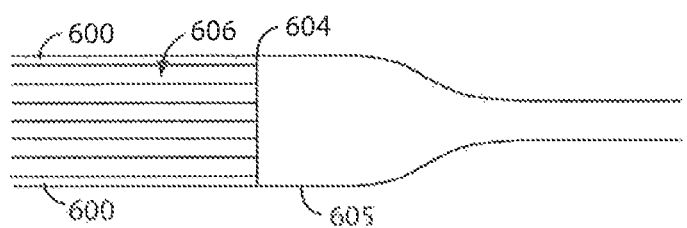
FIG. 6C shows one embodiment of an all pump combiner with cladless inputs.

To more fully appreciate how the disclosed embodiments permit more pump light to be introduced, attention is directed to FIGS. 6A through 6C, which disclose aspects of a novel all pump combiner (405, FIG. 4) in greater detail. Generally, embodiments of the all pump combiner allow for combining low NA pump light from several pump sources, resulting in a single high NA pump. With this in mind, discussion of the novel all pump combiner begins with FIG. 6A, which shows another embodiment of a capillary tube 600, preferably made of low index silica glass.

As shown in FIG. 6B, low NA (less than 0.22) pump input fibers 601 have coating and/or cladding removed on one end of the fibers, forming the cladless pump input fibers 602. In one embodiment the pump input fibers 601 are not doped and have a glass cladding. In other embodiments the pump input fibers 601 are down doped and have an air cladding. The cladless ends of the input fibers 602 are inserted into the capillary tube 600. The capillary tube 600 is then collapsed on the cladless pump input fibers 602, effectively fusing them together. The fused cladless pump input fibers 602 are cleaved at a suitable location 603 on the end opposite of the coated/cladded portion 601 of the pump input fibers, thereby forming the cladless all-pump combiner.

As shown in FIG. 6C, the cladless all-pump combiner 600 is fusion spliced 604 to a single solid optical fiber 605 (or fat fiber), which propagates the combined pump light. Preferably, the fat-fiber comprises a solid all silica fiber. In some embodiments the fat-fiber may be tapered at a ratio of approximately 2.72 to 1 in order to produce high NA light of approximately 0.45 or greater.

As cladding alone can represent up to 40% of the pump fiber diameter, removing the coating and/or cladding prior to combining the pump fibers in the all-pump combiner (FIG. 6B) reduces the outer diameter of each individual pump fiber. This outer-diameter reduction, when aggregated over multiple fibers, permits more pump fibers to be packed into any given cross-sectional area than if the coating and/or cladding had not been removed. The ability to pack more pump fibers together permits introduction of more pump light into the optical fiber-based gain system, which correspondingly results in increased power. Therefore, the embodiments disclosed herein permit combining more pump light than can be realized by conventional fiber-based gain systems. Stated differently, the disclosed embodiments of the cladless-input all pump combiner permits increasing the number of pump fibers that can be combined, thus allowing for increased pump energy to be introduced into the system resulting in increased optical fiber-based gain system performance.

Figure 7:
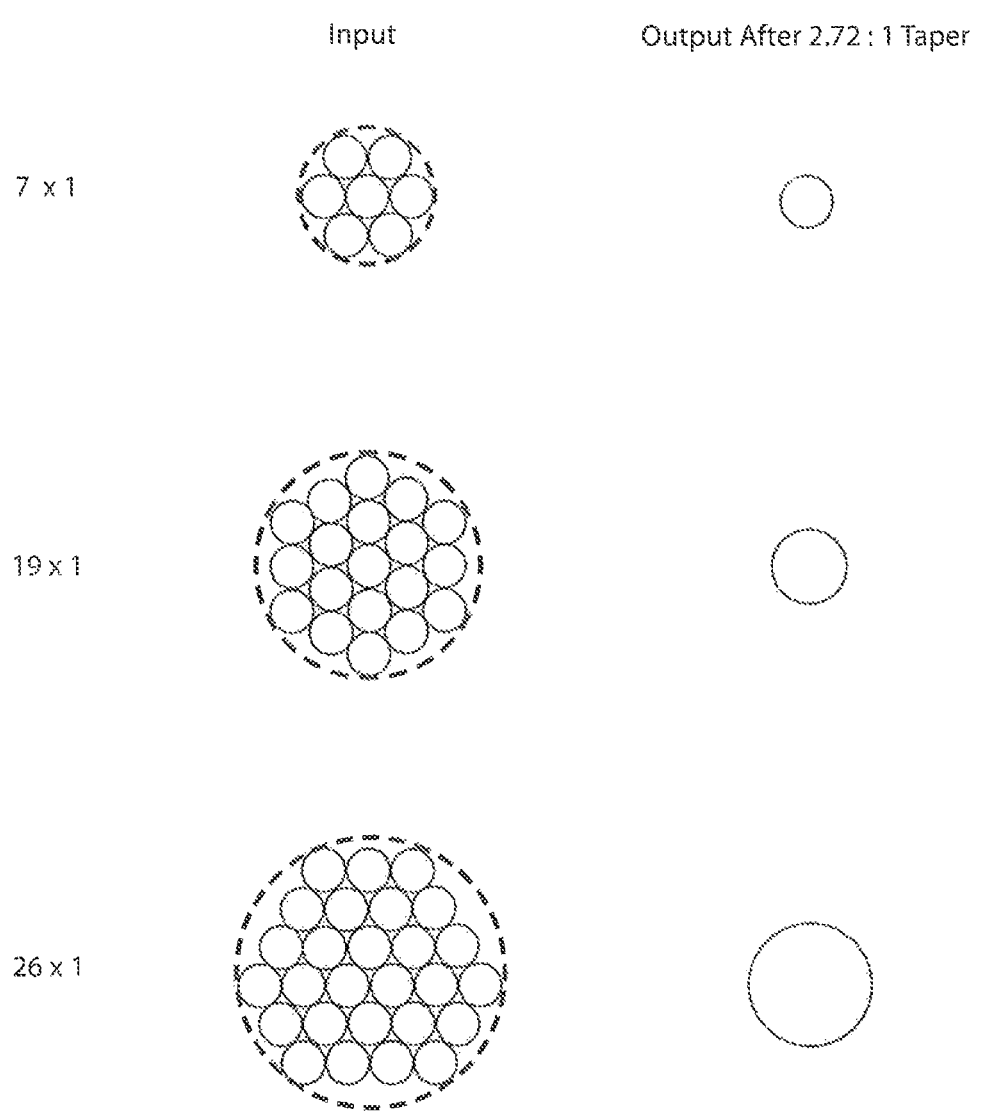
FIG. 7 shows cross sections of several embodiments of the disclosed all pump combiner with cladless inputs.

With this key advantage in mind, attention is directed to FIG. 7, which shows cross sections of several embodiments of the disclosed all pump combiner with cladless inputs. Conventional tapered pump and signal combiners are typically configured in a 7×1 configuration. In other words, six pump input fibers are arranged in a hexagonal pattern around a single signal fiber, and this close-packed structure is then fused and tapered to produce a single output fiber. As previously discussed, conventional TFBs are limited in their input diameter so as to not have too great of a taper, which would result in output light with a NA greater than 0.48 (FIGS. 2A and 2B). Therefore, typical end-pumped configurations are quite limited to how many pump fibers may be combined using a single TFB.

In contrast, as shown in FIG. 7, the disclosed embodiments of the all-pump combiner permit more pump fibers to be combined, which translates directly into increased fiber-based gain system output power, as more pump energy is introduced. A 7×1 configuration of pump and signal fibers is the tightest configuration possible, but also has the lowest energy potential. The number of input pump fibers can be increased according to the present embodiments to achieve configurations of at least 19×1 and 26×1, while still producing a single output pump light with a NA of 0.48. Preferably, the 7×1 and the 19×1 configurations are packed in a tight hexagonal configuration. Other embodiments may have looser packing structures.

It should be appreciated that the cladless input all-pump combiner allows the pump source to be effectively partitioned from the rest of the system, thus increasing flexibility in manufacturing, repairing, and upgrading the optical-fiber-based gain system as compared to conventional configurations. With this in mind, attention is directed to FIGS. 8A through 8C, which show various aspects of a fat fiber adapter, which, in some embodiments, connects the combined pump light from the all pump combiner to an optical-fiber-based gain system.

Figure 8A:
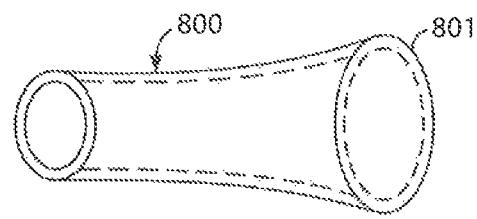
FIG. 8A shows another embodiment of a capillary tube.
Figure 8B:
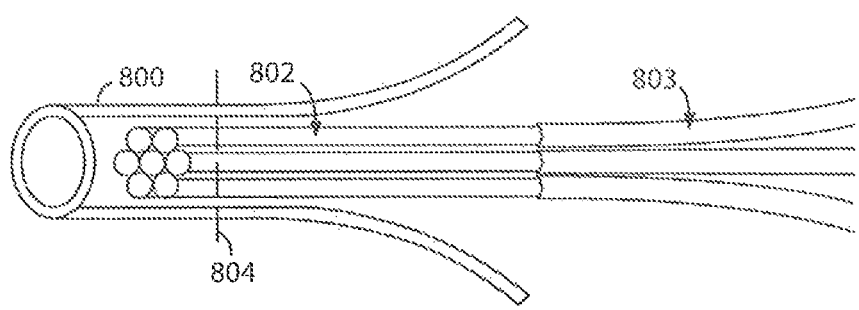
FIG. 8B shows coating and cladding free sections of coreless optical fibers inside the capillary tube of FIG. 8A.

As shown in FIG. 8A, manufacture of the fat fiber begins with a capillary tube 800 with a flared end 801. Continuing with FIG. 8B, the coating is removed from ends of coreless optical fibers 802, which are preferably silica-based fibers. Coreless silica fibers are used in this embodiment to avoid additional glass that can attenuate light propagation through the optical fibers that eventually comprise the fat-fiber adapter. The coating free ends 802 of the coreless optical fibers are inserted into the capillary tube 800 through the flared end 801 such that coated regions of the coreless optical fibers 803 remain outside of the capillary tube 800. The capillary tube 800 is collapsed on the bundle of coreless optical fibers 802 within the capillary tube 800, effectively fusing them. The fused fibers are then cleaved 804 at a suitable place on the fused end of the fibers forming an input end. Capacity of the optical fiber or amplifier system dictates the number of output fibers 803 used in the fat-fiber adapter. For example, for an optical-fiber-based gain system with a 7×1 pump and signal combiner, six output fibers 803 would stem from the fat fiber adapter. One having ordinary skill in the art will appreciate that other numbers of output fibers may be used.

Figure 8C:
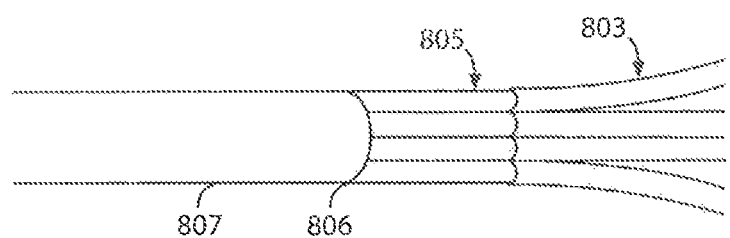
FIG. 8C shows one embodiment of a fat-fiber adapter for pump light.

Continuing with FIG. 8C, the cleaved end 804 (FIG. 8B) of the fused bundle 805 is spliced 806 to the fat-fiber 807. Preferably, the fused bundle 805 is formed to substantially match the input fat-fiber 807. One having an ordinary skill in the art will appreciate that any mismatch in overlap between the input fat-fiber 807 and the fused bundle 805 will result in pump light loss where no over lap between the input fat-fiber 807 and the fused bundle 805. In some embodiments, the fused bundle 805 shape is not substantially round, and there is a gradual transition in shape lengthwise along the fused bundle 805. This gradual transition is beneficial as it avoids abrupt changes and maintains interstitial spacing between the fibers in the fused bundle 805.

Preferably, the input fat-fiber 807 is optically coupled to the all-pump combiner described in FIGS. 6A through 7. As the fat-fiber adapter is configured to accept high NA pump light, one with ordinary skill will appreciate that for some embodiments it can also accept any light with a NA of less than 0.48. Therefore, for some embodiments of the fat-fiber adapter, the input fat-fiber 807 comprises a pump fiber from a generic pump source.

The output fibers 803 are preferably connected to the non-tapered high NA pump and signal combiner described in FIGS. 5A through 5D. For other embodiments, the output fibers may be connected to a conventional pump and signal combiner, such as a TFB. One having an ordinary skill in the art will appreciate that in embodiments that have the output fibers 803 coupled to an optical fiber-based gain system through a conventional pump and signal combiner, such as a TFB, the input light may be a low NA (approximately less than 0.22, preferably approximately 0.15) to avoid loss of light due to the change in NA resulting from the taper in a TFB.

Although exemplary embodiments have been shown and described, it will be clear to those of ordinary skill in the art that a number of changes, modifications, or alterations to the disclosure as described may be made.

What is claimed is:

1. A system, comprising:
   (a) a non-tapered fused fiber bundle, comprising:
      (a1) a signal fiber;
      (a2) high numerical aperture (NA) pump light input fibers fused radially exterior to the signal fiber to eliminate space between fibers as the fibers become fused;
      (a3) an input end having a NA of approximately 0.48;
      (a4) an output end having an NA of approximately 0.48; and
   (b) a double clad gain-doped optical fiber, the optical fiber being core and cladding match-spliced to the output end of the non-tapered fused fiber bundle.

2. A fused fiber bundle, comprising:
   a signal fiber; and
   pump light input fibers fused radially exterior to the signal fiber to eliminate space between fibers as the fibers become fused and to form a fused fiber bundle, the pump light input fibers having an input numerical aperture (NA), the fused fiber bundle having an output NA, the output NA being substantially identical to the input NA.

3. The apparatus of claim 2, the input NA being greater than approximately 0.22.

4. The apparatus of claim 2, the output NA being greater than approximately 0.22.

5. The apparatus of claim 2, the input NA being greater than approximately 0.48.

6. The apparatus of claim 2, the output NA being greater than approximately 0.48.

7. The apparatus of claim 2, the input NA being up to approximately 0.48.

8. The apparatus of claim 2, the output NA being up to approximately 0.48.

9. The apparatus of claim 2, further comprising a double clad output fiber optically coupled to an output end of the fused fiber bundle.

10. The apparatus of claim 2, the pump light input fibers being located concentrically exterior to the signal fiber.

11. The apparatus of claim 2, the fused fiber bundle being substantially non-tapered.

12. The apparatus of claim 2, further comprising:
a gain-doped optical fiber being core and cladding match-spliced to an output end of the fused fiber bundle.

13. A method, comprising:
launching a signal in a signal fiber; and
introducing a high NA pump light through a non-tapered fused fiber bundle, the non-tapered fused fiber bundle comprising the signal fiber, the non-tapered fused fiber bundle further comprising high NA pump light input fibers fused radially exterior to the signal fiber to eliminate space between fibers as the fibers become fused, the non-tapered fused fiber bundle having an input NA, the non-tapered fused fiber bundle further comprising an output NA, the output NA being substantially identical to the input NA.

14. The method of claim 13, introducing the high NA pump light through a non-tapered fused fiber bundle comprising:
introducing pump light having a NA greater than approximately 0.22.

15. The method of claim 13, introducing the high NA pump light through a non-tapered fused fiber bundle comprising:
introducing pump light having a NA greater than approximately 0.48.

16. The method of claim 13, introducing the high NA pump light through a non-tapered fused fiber bundle comprising:
introducing pump light having a NA up to approximately 0.48.

* * * * *